April 7, 1953 W. N. AGNEBERG 2,634,159
FISH GRABBER
Filed July 25, 1947
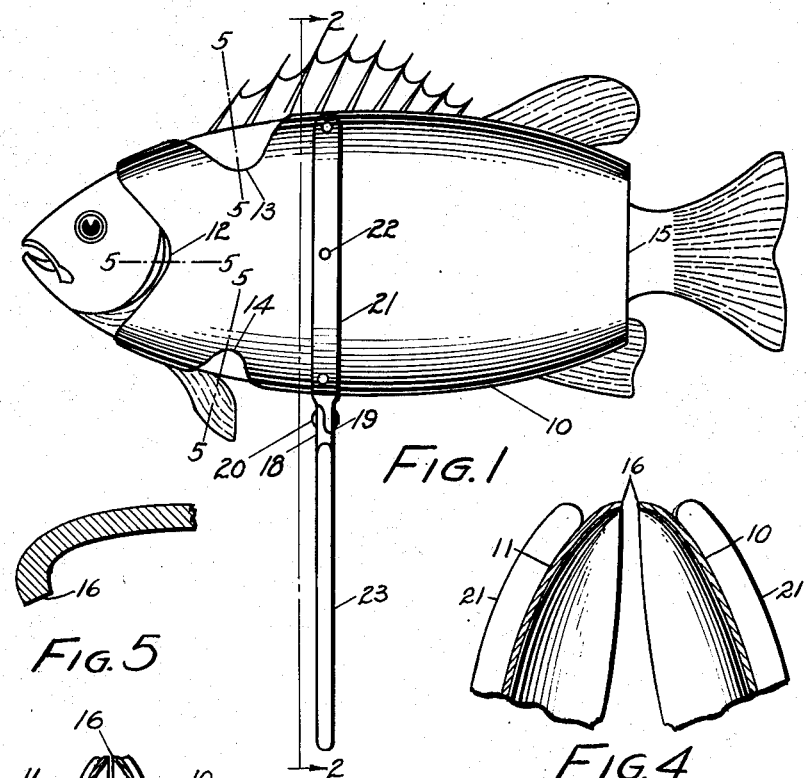
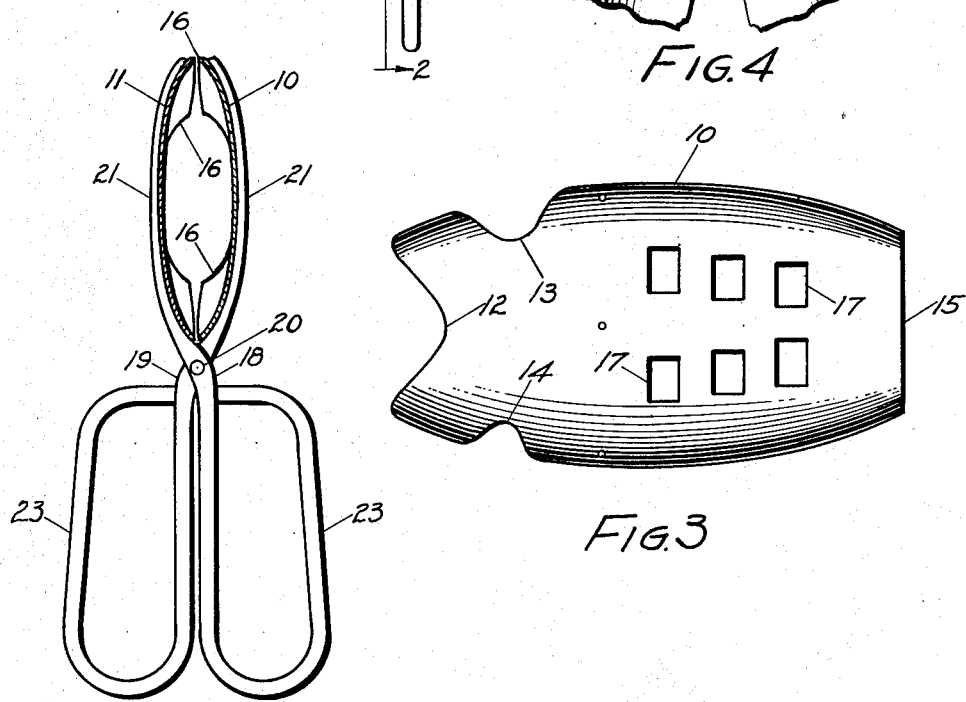
INVENTOR
WILMAN N. AGNEBERG
BY Philip M. Stutrud
ATTORNEY Patented Apr. 7, 1953

2,634,159

UNITED STATES PATENT OFFICE 2,634,159

FISH GRABBER

Wilman N. Agneberg, Minneapolis, Minn.

Application July 25, 1947, Serial No. 763,577

5 Claims. (Cl. 294—118)

This invention relates to fish grabbers, and particularly to such, as will hold securely and quietly different sizes and kinds of fish, while removing the hook, and at all times protect hands from contact with sticker fins and slime.

Very little has been accomplished in this field, to meet the general need. Plain gaff hooks are helpful in taking in some large fish, but are not of much use otherwise. Spring gaff hooks will also take in smaller fish, but mutilate all fish considerably, and require an accurate thrust to properly place same, so as to be effective. It is likewise with hand-grip grabbers, and since same take effect only in their plane with free action in both ends of the fish, it requires a strong grip to hold a fish. Because of this mechanical disadvantage, most women and quite a few men cannot use same effectively. Whether any of these devices mentioned are used or not, there is about the same likelihood of being pierced by a sticker fin with considerable chance of infection. There is the same danger with respect to removing hooks, due to actions of the fish, and when a hook has been swallowed by a fish, it is difficult to use a disgorger, unless the fish can be held perfectly still. All in all, any devices heretofore made, do not lend themselves to holding of fish handily and quietly, while removing the hook. Much contact with fish slime, is of course of itself disagreeable and bad for the hands.

One important object of my invention is to provide a fish grabber, that confines the fish to a rectilinear position, in which position its strength is ineffective, so that it may be quietly held by the fisherman with little effort, while removing the hook.

Another important object is to provide such a grabber, that will effectively accommodate a wide range of sizes of fish, and in all cases, fully protect the hands of the fisherman from slime and any that have sticker fins.

Another object is to provide such a fish grabber, which although possessing the desirable features stated in the preceding objects, is simple and may be cheaply manufactured.

Other objects will be apparent from the description and appended claims.

For a full disclosure of my invention, reference is made to the description following and to the drawings, in which—

Fig. 1 is an elevation view of the grabber.

Fig. 2 is a cross sectional view on line 2—2 of Fig. 1.

Fig. 3 shows a modification employing a plate with rectangular slots.

Fig. 4 is a fragmentary cross sectional view, on an enlarged scale, showing the sharply curved gripping edges of the plates. This is also taken on line 2—2 of Fig. 1.

Fig. 5 is a fragmentary view on a still further enlarged scale to show a cross section of the edge of the curved cuts, in one end and the two sides, taken on the lines 5—5 of Fig. 1.

In the selected embodiment of my invention, which is hereby disclosed, I provide metal plates 10 and 11, which are rectilinear on the line of their lengthwise axes or medians, but are varyingly curved transversely to accommodate the body of the fish. Each of the plates 10 and 11 have curved cuts 12, 13 and 14, which register with each other, when the two plates are brought together. These curved cuts adapt the plates to engage fish under their gill covers. Large fish are engaged at the end 12, while fish not so large are engaged at 13, and small fish at 14. In the case of eels, bull heads and the like, which have considerable slim length, both cuts or recesses 13 and 14 may be used to securely hold same, by engaging in one and extending through the other. Recesses 12, 13 and 14 are curved on the order of a parabola, so that in addition to having three sizes of same, each one has great latitude in the size fish that it can accommodate, because of such shape. Plates 10 and 11 have converging width toward ends 15, and since the plates are rectilinear on the line of their lengthwise axes or medians, there results space as shown in Fig. 2, accommodating fish of elongated body length like pickerel. The plates 10 and 11 have narrow, marginal, curved edges 16 around their perimeter, except at ends 15. These tong-like edges provide good gripping action around the gills, and also in general, in case a fish is not squarely within the grabber. In Fig. 3 is shown a modification of the invention, employing a plate having several rectangular slots 17, which aid in gripping and holding a thick set larger fish, like a bass. These slots may of course be varyingly shaped. In all cases and sizes of fish, the action of the grabber is such, that the fish is held in rectilinear position, so that the fish is precluded from getting into action. Handles 18 and 19 in crossed relation, which are readily opened and closed by means of a pivot 20, have curved extensions 21, that are secured to plates 10 and 11 by rivets 22 or otherwise. These handles preferably have hand loops 23, and are so arranged that when closed, the plates are in symmetrical relation to a plane passed normal to and midway between the handles. This results in a quite evenly distributed pressure of the plates on a fish. This is also substantially so in the case of the smaller fish, that are gripped in transverse positions.

From the foregoing, it is apparent how the grabber is constructed. In its use, the movement involved is a natural scooping action and closing. This works equally well with right or left hand. It is facilitated by the handles being a bit forward of the mid-point, which also intensifies the clamping action about the gills and better resists action of larger fish. The fish confined in the grabber is held by the plates in a rectilinear position, which has a paralyzing effect on it, and there is no chance for it to wiggle or squirm. The hook is therefore easily removed by the fisherman, without danger of injury from hook or sticker fins. The fish is then deposited into creel or sack or placed on a stringer, and the clamping action of the grabber released, with a minimum of contact between hands and fish. In fly fishing, it has also the advantage of keeping fingers clean, so that flies may be tied and untied more readily. In ice fishing, hands and mitts may be kept dry, since no contact with the fish is required.

While I have shown and described a preferred form of my invention, it is obvious that many changes, which are within the scope of my invention, will be apparent to those skilled in the art. I therefore desire to be limited only by the scope of the appended claims.

What I claim is:

1. A fish grabber comprising a pair of cross pivoted handles, bowed jaws carried by the outer ends of said handles and a pair of coacting plates fixedly mounted on said jaw; said handles having loops, both of which are adapted to receive the fingers and the thumb respectively of a hand; said jaws lying substantially in the same plane with the loops of said handles, and being so bowed, that when said handles are closed, an oval shaped opening is formed between said jaws, which is substantially symmetrical about a plane passed normal to and midway between the loops of said handles; said plates one of which is right hand and the other left hand, corresponding in size, shape and relative position of parts, that are on opposite sides of said plane, said plates conforming substantially to the shape of said jaws on the lines of mounting but with a taper toward respective ends and having substantially symmetrical transverse curvature on each side of their rectilinear lengthwise axes, each of said plates having respectively, a recess at one end adapted to engage gills of large fish positioned longitudinally of said plates, and recesses in respective sides thereof adapted to engage gills of smaller fish positioned transversely of said plates, all of said recesses having such varyingly curved contour that a range of sizes of fish may be accommodated in each, said plates being mounted on said jaws so that the length is divided with a substantially lesser distance to the end with the recess, said recessed end and the sides of said plates having sharply curved hook shaped edges, whereby the clamping action of the grabber is aided by a gripping of the edges on the surface of the fish.

2. A fish grabber as claimed in claim 1, characterized by the addition of a plurality of polygonal slots of substantial size in the plates, arranged substantially symmetrical about the lengthwise axes of the plates, but varyingly spaced with respect thereto, so as to provide a latitude of contact with sides of a fish, the edges of said slots engaging scales and protruding surface of a fish firmly as pressure is applied on the grabber, whereby fish which are thick set and large with respect to the grabber can be securely held.

3. A fish grabber comprising a pair of crossed pivoted handles, bowed jaws carried by the outer ends of said handles and a pair of coacting plates fixedly mounted on said jaws; said handles having loops, both of which are adapted to receive the fingers and the thumb respectively of a hand; said jaws lying substantially in the same plane with the loops of said handles, and being so bowed, that when said handles are closed, an oval shaped opening is formed between said jaws, which is substantially symmetrical about a plane passed normal to and midway between the loops of said handles; said plates, one of which is right hand and the other left hand, corresponding in size, shape and relative position of parts, that are on opposite sides of said plane, said plates conforming substantially to the shape of said jaws on the lines of mounting but with a taper toward respective ends and having substantially symmetrical transverse curvature on each side of their rectilinear lengthwise axes, said plates being mounted on said jaws so that the length is divided with a substantially lesser distance to the end adapted to engage the head end of the fish, each of said plates having curved recessed means stationed in the head engaging end and the two sides respectively of said plates, so that when the plates are brought together by the closing of the handles there results a gripping contact by said means under the gill covers of the fish, said means having compounded varying curvature progressively decreasing in dimension inwardly, so that substantial latitude of size of fish accommodated is provided in each station, and said means further so dimensioned that the sizes accommodated advance from one side of the plates to the other and then to the end to there accommodate the largest fish longitudinally of the plates, said plates having slight marginal but sharply curved flanges projecting inwardly along the two sides and one end where said means are located.

4. A fish grabber comprising a pair of crossed pivoted handles, bowed jaws carried by the outer ends of said handles and a pair of coacting plates fixedly mounted on said jaws; said handles having holding means adapted to accommodate the fingers and the thumb respectively of a hand; said bowed jaws, when the handles are closed, forming an oval shaped opening therebetween that is substantially symmetrical about a plane, passed normal to the plane of said handles and bisecting the angle between said handles; said plates, one of which is right hand and the other left hand, having its corresponding portions similarly positioned about said bisecting plane, said plates conforming substantially to the shape of said jaws on the lines of mounting but with a taper toward the respective ends and having substantially symmetrical transverse curvature on each side of their rectilinear lengthwise axes, each of said plates having respectively, a recess at one end adapted to engage gills of large fish positioned longitudinally of said plates and recesses in respective sides thereof adapted to engage gills of smaller fish positioned transversely of said plates, all of said recesses having a curved contour on the order of a parabola, so that a range of sizes of fish may be accommodated in each and advancing to the next larger recess, and means in connection with the one end and two sides of the plates where said recesses are located, creating a tong like grip of the edges of said plates in holding a fish under the gills and anywhere against the body.

5. A fish grabber comprising a pair of crossed pivoted handles, bowed jaws carried by the outer ends of said handles and a pair of coacting plates fixedly mounted on said jaws; said handles having loops, both of which are adapted to receive the fingers and the thumb respectively of a hand; said jaws lying substantially in the same plane with the loops of said handles, and occupying a symmetrical position about a plane passed normal to and midway between the loops of said handles; said plates, one of which is right hand and the other left hand, corresponding in size, shape and relative position of parts, that are on opposite sides of said plane, said plates conforming substantially to the shape of said jaws on the lines of mounting, but with a taper toward respective ends and having substantially symmetrical transverse curvature on each side of their rectilinear lengthwise axes, each of said plates having respectively, a recess at one end adapted to engage gills of large fish positioned longitudinally of said plates and recesses in respective sides thereof adapted to engage gills of smaller fish positioned transversely of said plates, all of said recess having such varyingly curved contour that a range of sizes of fish may be accommodated in each, said plates having sharply curved hook shaped edges projecting inwardly along the two sides and the recessed end and being mounted on said jaws so that the length is divided with a substantially lesser distance to the end with the recess, said plates coacting with said handles and jaws, whereby a large fish positioned longitudinally between said plates is held in a rectilinear position by reason of the rectilinear contact along the lengthwise axes of said plates, and when pressure is applied by said handles the fish has not the needed advantage to wiggle laterally but is held motionless.

WILMAN N. AGNEBERG.

REFERENCES CITED

The following references are of record in the file of this patent:

UNITED STATES PATENTS

| Number | Name | Date |
|---|---|---|
| 280,651 | Miller | July 3, 1883 |
| 1,949,452 | Chadwick | Mar. 6, 1934 |
| 2,263,965 | Fiori | Nov. 25, 1941 |